United States Patent [19]

Hannen et al.

[11] Patent Number: 5,111,528
[45] Date of Patent: May 5, 1992

[54] APPARATUS FOR HEAT SHRINKING WRAPPING USING ELECTRICAL AIR HEATING

[75] Inventors: Reiner W. Hannen, Goch-Pfalzdorf; Norbert P. Vermeulen, Kleve-Warbeyen; Josef Schulze-Frenking, Kleve, all of Fed. Rep. of Germany

[73] Assignee: MSK-Verpackungs-Systeme Gesellschaft mit Beschrankter Haftung, Kleve, Fed. Rep. of Germany

[21] Appl. No.: 491,678

[22] Filed: Mar. 12, 1990

[30] Foreign Application Priority Data

Mar. 10, 1989 [DE] Fed. Rep. of Germany ... 8902969[U]
Nov. 14, 1989 [DE] Fed. Rep. of Germany ... 8913441[U]

[51] Int. Cl.⁵ .................. B29C 61/02; B65B 53/06
[52] U.S. Cl. .................. 392/379; 219/400; 34/215; 53/557
[58] Field of Search .............. 219/374–376, 219/381, 382, 388, 400; 53/557; 392/379–380, 381–382, 360; 34/132, 100, 212–221

[56] References Cited

U.S. PATENT DOCUMENTS

| 1,679,841 | 8/1928 | Shaw | 219/388 |
| 3,662,512 | 5/1972 | Zelnick | 53/557 |
| 3,668,817 | 6/1972 | Bell | 219/388 |
| 3,711,961 | 1/1973 | Spiegel et al. | 34/236 |
| 3,777,446 | 12/1973 | Graver | 219/388 |
| 3,896,288 | 7/1975 | Tulkoff | 219/388 |
| 3,912,903 | 10/1975 | Northrup, Jr. et al. | 219/375 |
| 4,066,866 | 1/1978 | Fresnel | 34/216 |
| 4,337,390 | 6/1982 | Best | 219/374 |
| 4,451,233 | 5/1984 | Lachenmeier et al. | 53/557 |
| 4,536,642 | 8/1985 | Hamster et al. | 219/375 |

FOREIGN PATENT DOCUMENTS

| 8902969U1 | 6/1989 | Fed. Rep. of Germany. | |
| 8913441U1 | 2/1990 | Fed. Rep. of Germany. | |
| 536754 | 5/1922 | France | 219/376 |
| 1062349 | 2/1966 | United Kingdom | 53/557 |
| 2046697 | 7/1980 | United Kingdom | 53/557 |

Primary Examiner—Bruce A. Reynolds
Assistant Examiner—John A. Jeffery
Attorney, Agent, or Firm—Herbert Dubno

[57] ABSTRACT

A shrinking frame for foil wrap or hoods to be shrink wrapped on a stack of goods has a shaft-like configuration of the path for producing hot air within the limbs of the frame between the inlet opening and an outlet slit. The resistance heating rods are located in at least one and preferably both of the segments of the U-shaped flow passage.

23 Claims, 6 Drawing Sheets

APPARATUS FOR HEAT SHRINKING WRAPPING USING ELECTRICAL AIR HEATING

FIELD OF THE INVENTION

Our present invention relates to a shrinking frame having an inlet connectable to a blower or some other source of an air flow, air-guide passages in which electrically heatable heating elements are disposed, and an air outlet arranged along the inner sides of the shrinkage frame for discharging the hot air.

BACKGROUND OF THE INVENTION

Such shrinking frames are provided for the shrinking of shrink wrap hoods or foils of plastic material which can be placed around an article, e.g. a stack of guides on a pallet, for shrink wrapping such products. The shrinking frame generally comprises frame members connected to one another to define a central opening and thus surrounding this opening. The opening is of such size that the shrinking frame can surround the stack to be wrapped and can be raised and lowered therealong so that the hot air emanating from the air outlet can be directed against the shrink hood or shrink foil so as to shrink it against the product to be wrapped.

With shrink frames which are electrically heated, the supplied air is heated by passing over and around electrically heated heating elements received in the frame members or limbs. Since the frame limbs generally are of comparatively small cross section, the flow path traversed by the air and serving for heating the air is comparatively short.

OBJECTS OF THE INVENTION

It is the principal object of the present invention to provide a shrink frame for the purposes described which can more effectively heat the air using electrically heated heating elements.

A more general object of the invention is to provide an improved shrink frame which obviates drawbacks which have been uncovered with prior art shrink frames.

SUMMARY OF THE INVENTION

These objects and others which will become apparent hereinafter are attained, in accordance with the invention by forming the air guide passages in the frame members or limbs so that they extend in cross sectional planes of the frame and define a U-shaped flow path for the air to be heated. The heating elements are provided in at least one of the U-shanks of the flow path.

More specifically, the shrinking frame of the invention comprises:

a plurality of hollow frame members surrounding an opening into which the article can pass;

an air inlet opening into the frame members;

outlet means formed along inner sides of the frame members for directing hot air toward the article when the article is received in the opening;

air-guide passages formed in the members and interconnecting the inlet with the outlet means, the air-guide passages having segments extending substantially linearly in cross sectional planes of the members and defining U-shanks of a U-shaped flow path for air between the air inlet and the outlet means within each of the members; and electric heating elements in at least one of the U-shanks of each of the U-shaped flow paths for heating air traversing same.

A U-shaped flow path allows relatively long heating paths to be formed in relatively small cross sections of the frame limbs so that the heated air has sufficient time for the heating and the path over which heat transfer to the air from the heating elements can be comparatively long.

The heating efficiency is most improved when, as is preferred, both segments or U-shanks of the U-shaped flow path are equipped with heating elements. The associated redirection of the air flow between the U-shanks results in an intensive turbulence in the air stream so that a uniform heating of the air is measured.

Preferably the U-shaped flow path is formed by a shaft which is open at one end or side and which has a partition extending into it from the shaft opening and which is spaced from the closed end of the shaft so that this partition defines with one of the shaft walls a first U-shank or segment of the flow path and with the opposite shaft wall the second U-shank or segment. The first U-shank or segment can be connected to the air inlet while the second U-shank or segment is connected to the air outlet.

Since the shaft walls and the partition are heated by the radiation from the heating elements, they are also capable of reradiating heat and conductively participating in the heat exchange which results in heat transfer to the air. The shaft can be embedded in insulating material which can externally surround the shaft.

The heating elements can be formed as heating rods which can extend in the longitudinal direction of the shaft and can be mounted in at least two mounted plates which can be spaced apart along the rods and, as a consequence, have the configuration of bulkhead plates.

Such bulkhead plates, composed of metal, can be arranged between the partition and the shaft walls. Since these plates extend in the flow direction, they do not significantly hinder the flow. On the contrary, they serve to subdivide the flow path in the interior of the shaft into a plurality of partial flow path segments to increase turbulence, improve heat exchange and, in general, increase the heating efficiency. Preferably a considerable number of such baffle plates are provided.

The heating rods are generally connected in a conventional manner to an electric power source. Preferably identically poled terminal-forming ends of the heating rods are electrically connected together, for example by current-carrying busbars Advantageously, the heating rods themselves have U-shaped configurations so that the two terminal rod portions of each heating rod have their ends at one side. In this case as well, the identically poled terminal ends of neighboring heating rods can be connected by the current-carrying busbars. This arrangement has advantages with respect to the electrical supply and cabling of a shrinking frame.

In a preferred embodiment, the heating rods or their U-shanks in a cross sectional projection of the shaft are oriented at an angle to the partition, whereby the spacing of the rod center is equal to or greater than twice the rod diameter. This makes it possible to provide a comparatively compact and dense arrangement of a multiplicity of heating rods within the segments of the flow path formed in the shaft and thus a high heat transfer density of the heating surfaces.

In a preferred embodiment, the shaft is upright in the frame limbs and the shaft opening is turned downwardly. The shaft can also lie horizontally or can include an angle to the horizontal in the respective frame.

The air outlet is advantageously a slit nozzle formed along the inner side of the frame limbs and defined by or flanked by air-guide plates which are disposed at angles to the frame plane, while a flow path segment is provided between the slit nozzle and the shaft to prevent direct radiation outwardly from the heating rods. As a result direct radiation from the rods onto the hood or foil to be shrunk from the heating rods is precluded. The direction in which the hot air is blown onto the shrink foil on the article can be adjusted as need requires when the angular position of at least one of the air guide plates is adjustable.

Since not all stacks of goods to be shrink wrapped have the same dimensions it is advantageous according to a feature of the invention to provide on the frame in the direction of the stack, adjustable air-blocking elements to reduce the possibility that hot air from the slit nozzles will pass unused therefrom.

A greater utilization of the heat content of the hot air can be achieved when the vertical walls of the frame serve as hot air guide surfaces Finally, in accordance with this aspect of the invention, it can be observed that the frame can be formed with a hood in which hot air is collected during standstill of the apparatus so that, during the operating phase a larger hot air volume can be provided directly for the shrink material The fresh air to be heated is supplied from the air inlet to the shaft advantageously by an air distribution passage formed along an outer portion of the frame. This air distribution passage has air transfer openings distributed therealong and communicating with the shaft between the bulkhead plates which subdivide the latter into partial passages When the sizes of the air feed openings and hence the flow therethrough is adjustable, according to the invention, the partial passages can be supplied with different quantities or volume flows of air so that different heating air quantities can be delivered at various locations along the slit nozzle.

A shrinking frame in which the heating rods are integrated into the frame limbs and which is easily assembled and subject to a minimum of thermal stress can have its heating rods extending substantially parallel to the frame sides and arranged in thermally insulated heating cores with air-feed passages The heating rods can be fixed with one end to the heating cores and the remainder of the heating rod can be shifted in and relative to the heating cores in accordance with the heating rods. As a result of the arrangement of the heating rods in the heating cores, there is a greater ease of mounting, assembly and disassembly because the heating cores can be removed as units from the shrinking frame for repair or replacement of, for example, failed heating rods. The fact that the heating rods are fixed at only one side in the heating cores ensures that thermally generated mechanical stresses from the thermal expansion of the heating rods cannot arise. This also facilitates mounting.

In a preferred embodiment of this construction, the heating cores are provided with holding bars which extend in the direction of the frame sides and which, at one end, are fastened in fixedly positioned plates while their other ends are guided in a loose mounting plate. With the fixed mounting plate and the loose mounting plate, moreover, the heating core is supported in the shrinking frame Since the holding bars form part of the mounting system for the heating core and are only guided in the loose mounting plate and are not fixed therein, the thermal expansion of the heating bars themselves is permitted without thereby generating stresses in the remaining portions of the heating core. The heating rods likewise can be fastened to the fixed plate while the remainders of the rods can be supported in the bulkhead plates mentioned previously and which can be carried by the holder bars. The heating rods can thus thermally expand and contract together with or relative to the baffle plates.

In a highly advantageous construction, the bulkhead plates themselves may have a U-cross section so that their U-shanks extend in the direction of the frame sides and are bridged by a web of the U having throughgoing openings traversed by the holding bars and the heating rods.

The air to be heated is thus directed along the longest possible path along the heating rods, especially where the heating core has an intermediate or middle bulkhead extending in the direction of the longitudinal frame sides and comprised of a plurality of mutually spaced partial bulkheads connected to a holding bar. This spacing of the central bulkhead limits the possibility of forming corrugations in the middle bulkhead under the effect of thermally generated stresses.

The bulkhead plates with their U-shanks are so arranged in the regions of the gaps between the partial bulkheads that the air passages separated by the middle bulkhead are also separated in a flow sense from one another when the heating rods are provided on both sides of the middle bulkhead.

For insulation, each of the heating cores is covered by an insulating hood which has a U-cross section. The insulating hood preferably has inner and outer cover layers sandwiching an insulating material between them so that fibers, small particles or particulates of the insulating material are not entrained by the air stream. The inner cover layer advantageously comprises mutually spaced cover segments to avoid the formation of undulations or corrugations therein by thermally generated stresses. Additionally, the heating core can be provided in the region of the fixed mounting plate and/or the loose mounting plate with cool zones which can be cooled by fresh air.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
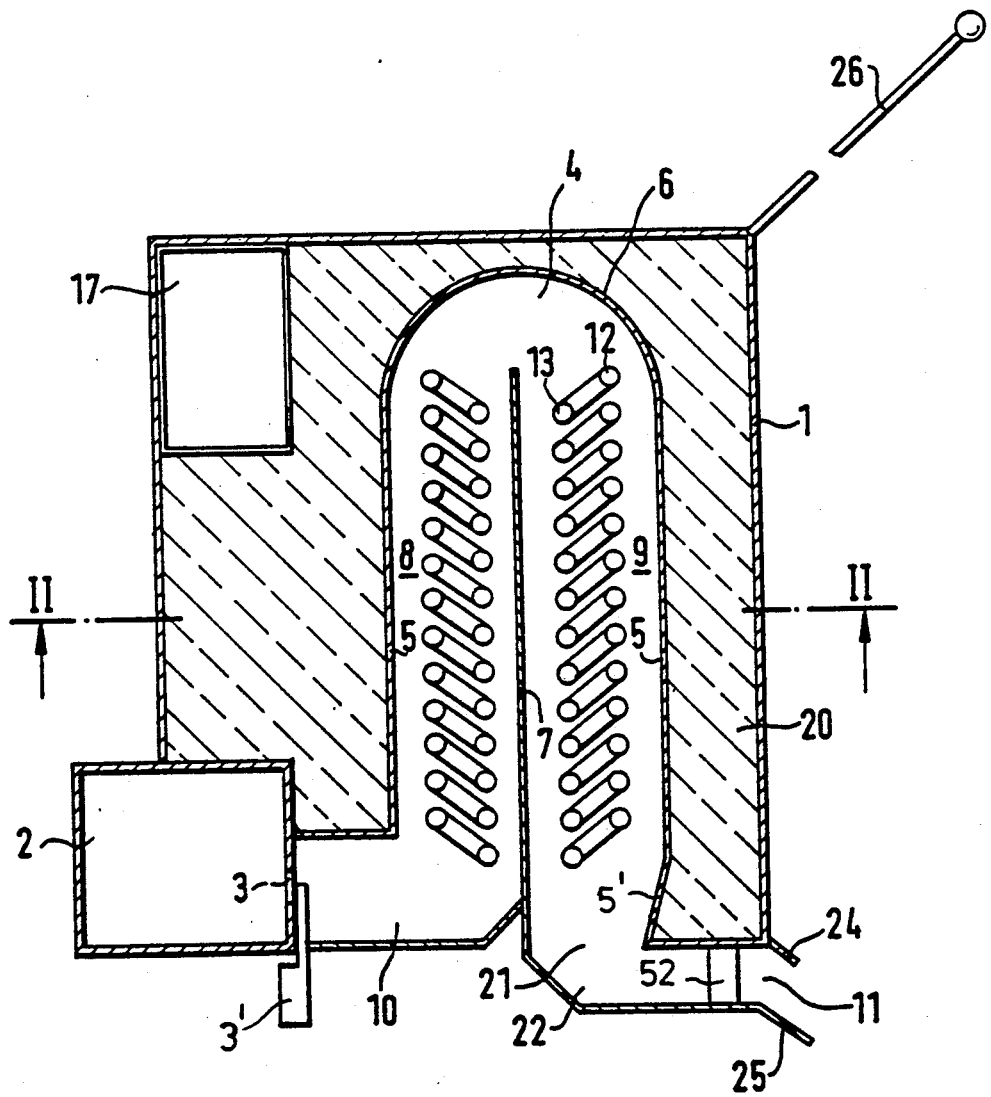
FIG. 1 is a schematic cross sectional view through a frame limb or member of an electrically heated shrinking frame according to the invention.
Figure 2:
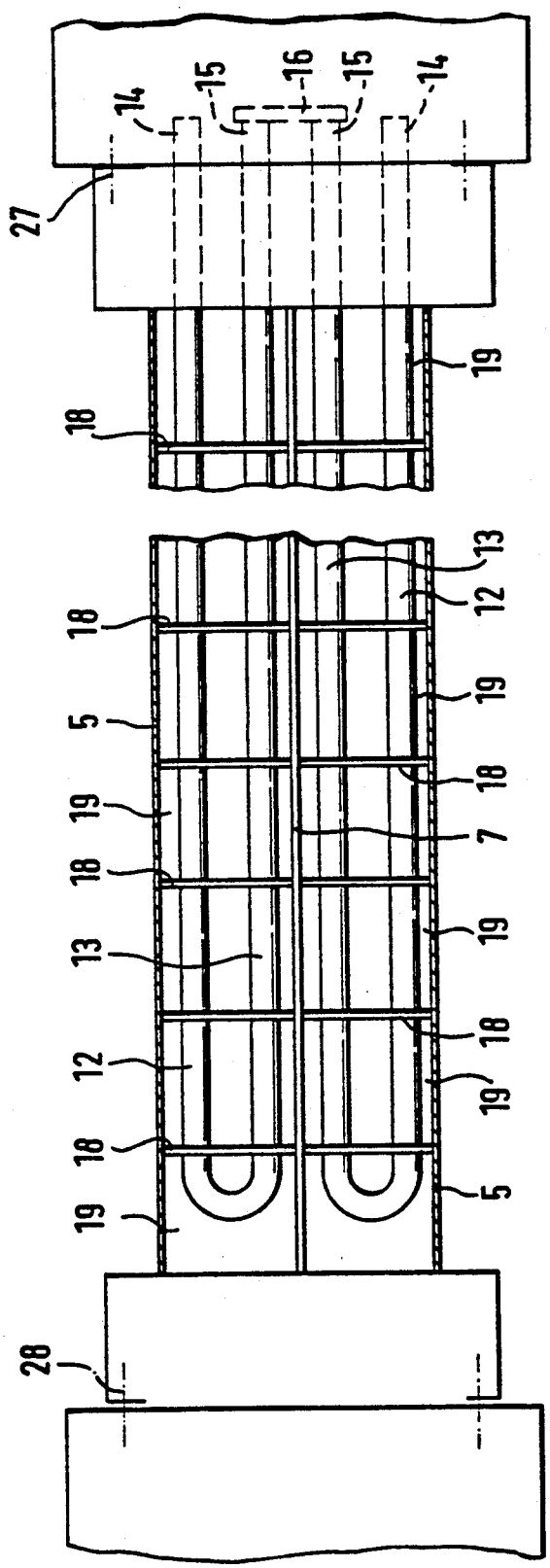
FIG. 2 is a section taken along the line II—II of FIG. 1.
Figure 5:
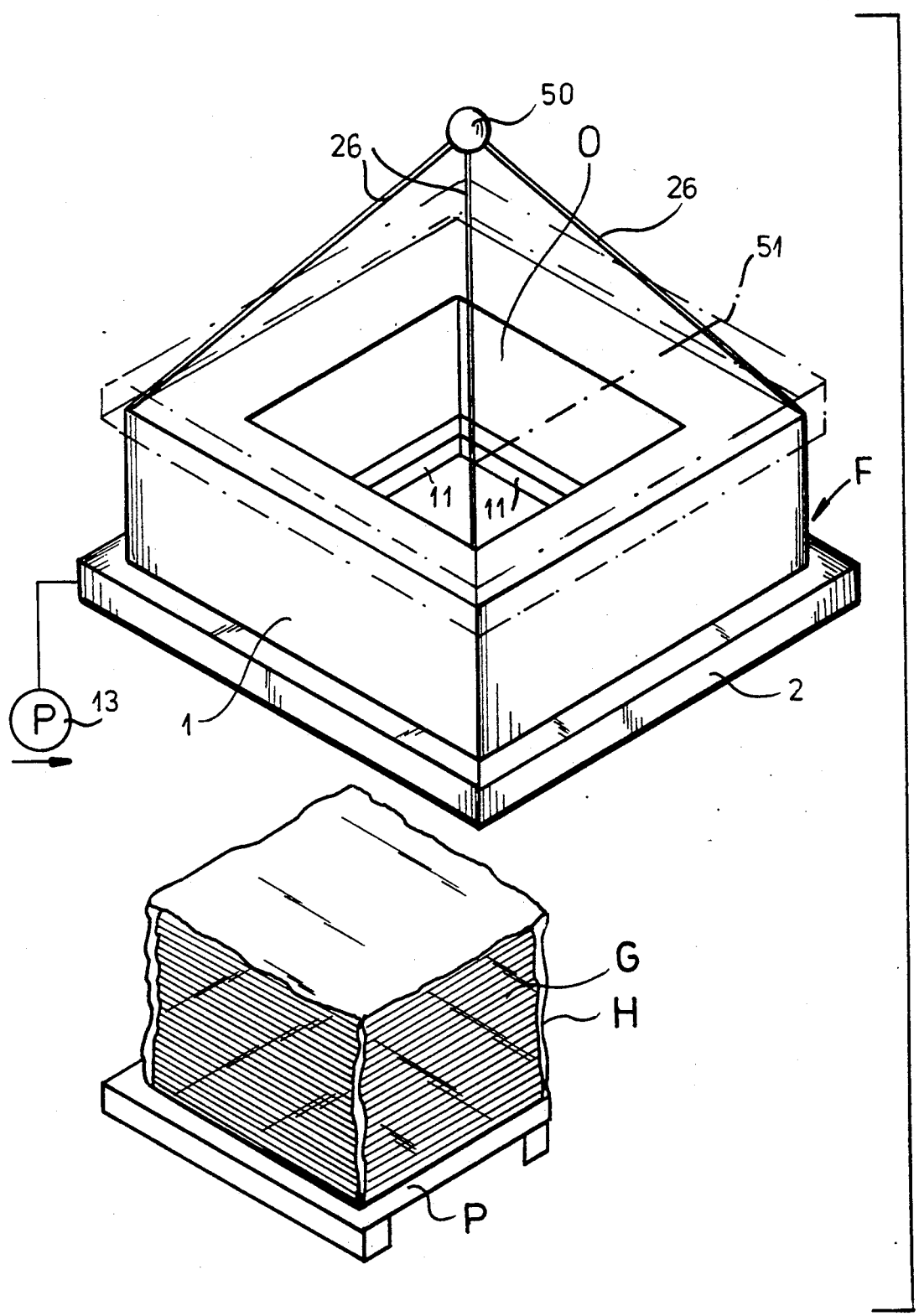
FIG. 5 is a diagrammatic perspective view showing a shrink frame about to be lowered over a stack of goods to be shrink wrapped according to the invention.

The shrinking frame shown in FIG. 5 and partly illustrated in FIGS. 1 and 2, serves for the shrinking of a shrink foil hood H or a shrink foil web or wrap around a stack of goods G, especially a stack of palletized goods on, for example, a pallet P (FIG. 5).

The shrink frame F (FIG. 5) is a rectangular or square array of the frame limbs or members 1 illustrated in detail in FIGS. 1 and 2.

The frame limbs 1 delimit internally an opening 0 into which the stack G can pass as the frame is lowered by, for example, a crane or winch utilizing an eye 50 to which cables 26 running to the corners of the frame are connected.

On each frame limb or member 1 at a lower portion of the outer side thereof, an air distribution duct 2 is provided, the duct 2 being connected by an inlet not visible in the drawing to a blower B represented diagrammatically in FIG. 5.

All of the air distribution ducts 2 of the frame limbs or members 1 can be connected together as shown in FIG. 5 and thus can be connected to a common air inlet. The air distribution ducts 2 have respective pluralities of air delivery openings 3 (FIG. 1) at least some of which can be controlled by, for example, sliders 3' for adjusting the flow cross sections of these openings individually.

Each frame limb 1 is provided in the embodiment shown in FIGS. 1 and 2 with a downwardly open upright shaft 4 whose shaft walls 5 of sheet metal are interconnected by an arcuate portion 6 of semicircular cross section Extending centrally in the shaft 4 is a partition 7 which extends in the longitudinal direction of the shaft 4 upwardly from the lower end of the shaft to terminate at a distance below the arcuate portion 6.

The partition 7 defines two flow path segments 8 and 9 for the air to be heated, this flow path having an inverted U configuration so that the segments 8 and 9 constitute U shanks.

The air supplied through the openings 3 from the air distribution duct 2 is admitted via a passage 10 upstream of the segment 8, to the latter. The air flows through the segments 8 and 9 and emerges from a slit nozzle 11 forming the outlet means and open toward the interior of the frame and the inner side of the frame limb 1.

During passage through the flow path 8, 9, the air is heated in the shaft 4 by electrically heatable (resistance) heating elements which are constituted by U-shaped heating rods whose U-shanks 12 and 13 extend in the longitudinal direction of the shaft or the frame limb or member 1.

Consequently, the two terminal ends 14, 15 of each heating rod lie in the same cross sectional plane of the frame limb or member 1. Identically poled terminal ends or connection ends 14 or 15 of the heating rods in the segments 8 and 9 are interconnected electrically by current-carrying busbars 16.

The electrical supply to the busbars is effected via conductors which can pass through a cable duct formed along an outer side of the respective frame limb or member.

The heating rods have their U-shanks 12 and 13 supported in a plurality of bulkhead plates which are visible at 18 in FIG. 2 and extend parallel to the cross sectional plane of FIG. 1. The bulkhead plates 18 are disposed between the respective partition 7 and shaft walls 5 and can extend to the passage 10 and the slit nozzle 11 so as to subdivide the flow path for the air to be heated into a plurality of mutually parallel partial passages 19.

The heating rods are oriented so that their U-shanks lie in planes which include angles of 45 with the partition 7 (see FIG. 1) so that the spacing of the heating rod centers is equal to or greater than twice the heating rod diameter. This provides an especially dense arrangement of the heating rods in the segments 8, 9 of the shaft 4 and thus a high energy transfer density. The shaft walls 5 and the partition 7 are comprised of sheet metal which intercepts radiant energy from the heating rods and in turn transfers thermal radiation to the air flowing though the shaft. To substantially eliminate heat loss, the shaft 4 is totally embedded in insulating material 20.

At the lower end of the segment 9 of the path, there is a constriction 21 at which the path opens into a connecting passage 22 communicating with the outlet slit or slit nozzle 11. The constriction 21 can be formed by an apron 5' of the wall 5 of this segment of the path angled inwardly at about 15° from the vertical toward the partition 7. The constriction and the passage 22 are so dimensioned and configured that direct outward radiation from the heating rods 12, 13 onto the foil or guides to be packaged therein is avoided.

Figure 3:
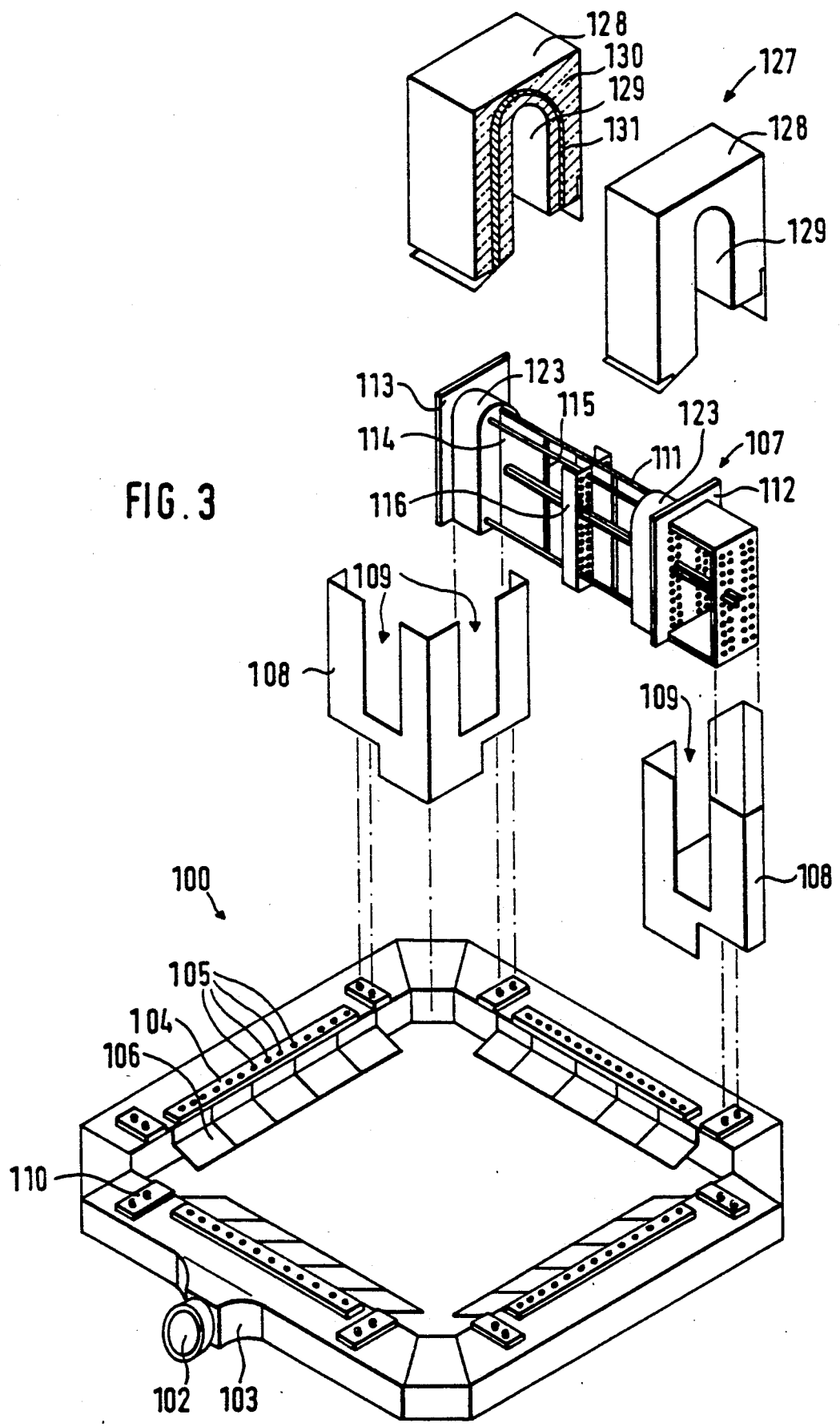
FIG. 3 is an exploded perspective view, partially broken away, illustrating another embodiment of a shrinking frame according to the invention.
Figure 4:
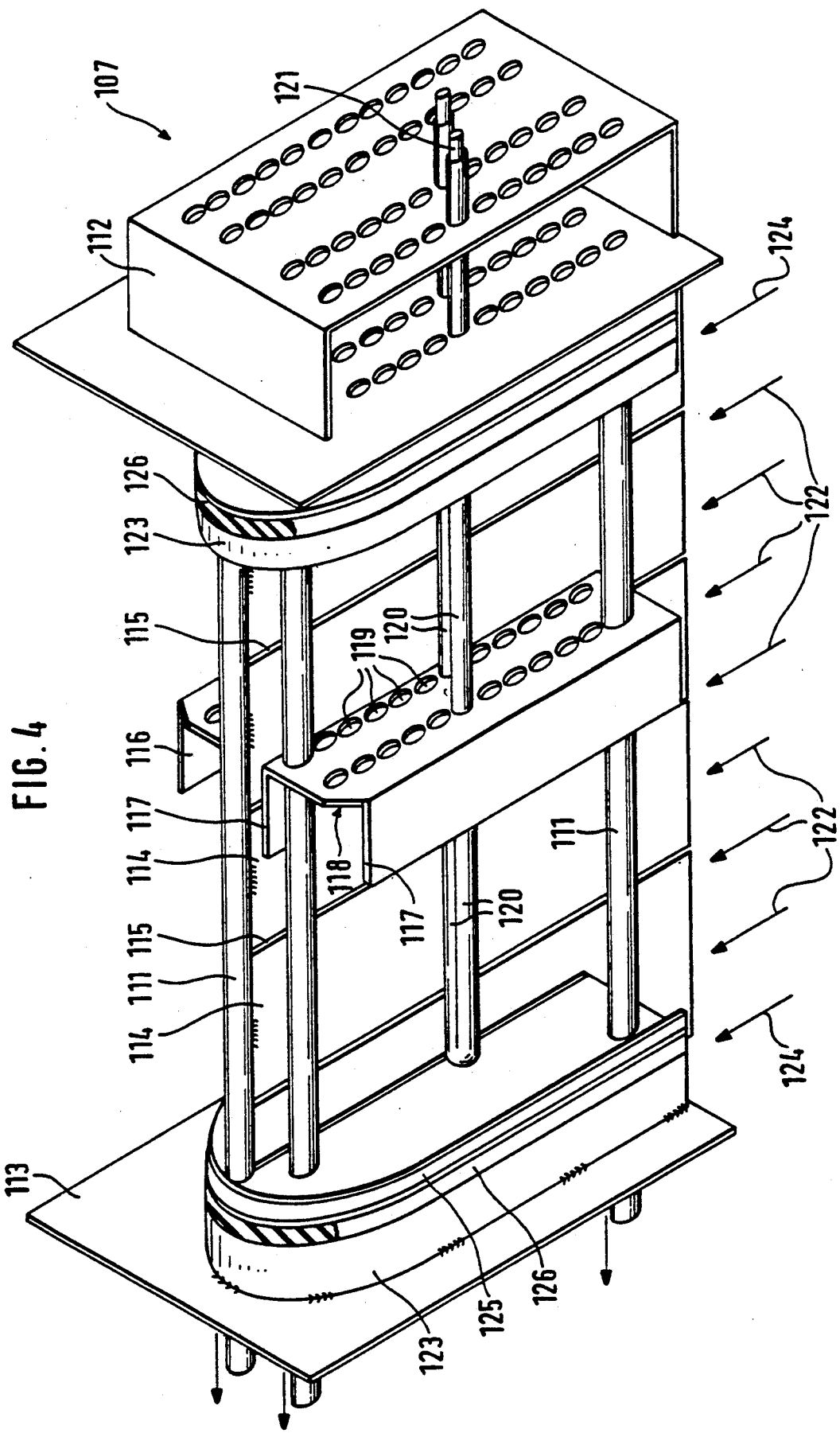
FIG. 4 is a perspective view of a detail of FIG. 3 showing a heating core drawn to a larger scale.

In FIGS. 3 and 4, 1 have shown elements of a shrinking frame 100 of rectangular or square outline which can be used in a manner similar to that of FIGS. 1, 2 and 5. The shrinking frame here comprises a tubular frame of flattened rectangular cross section, one side of which is provided with an air inlet 102 feeding a funnel-shaped inlet fitting 103.

Figure 1A:
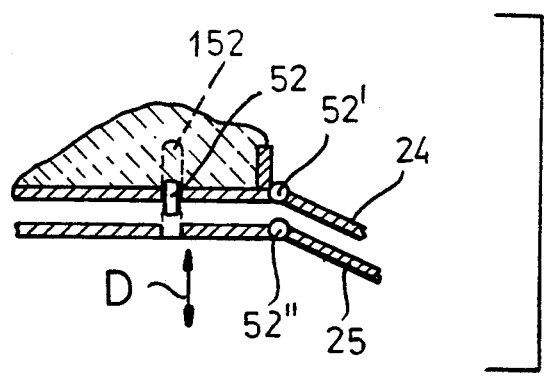
FIG. 1A is a highly diagrammatic view showing a part of the frame limb according to FIG. 1.
Figure 6:
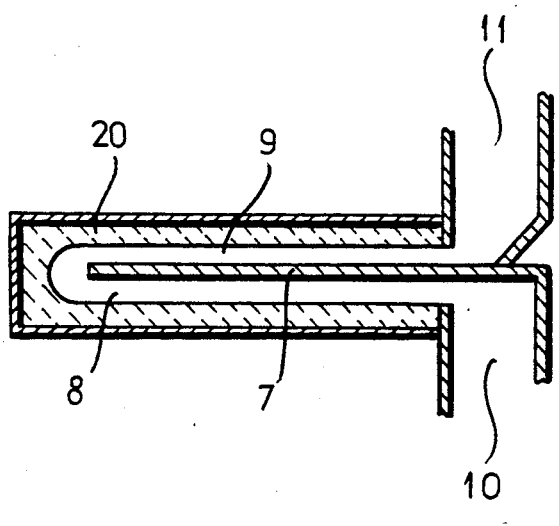
FIG. 6 is a schematic cross sectional view through a frame limb of another embodiment according to the invention.
Figure 7:
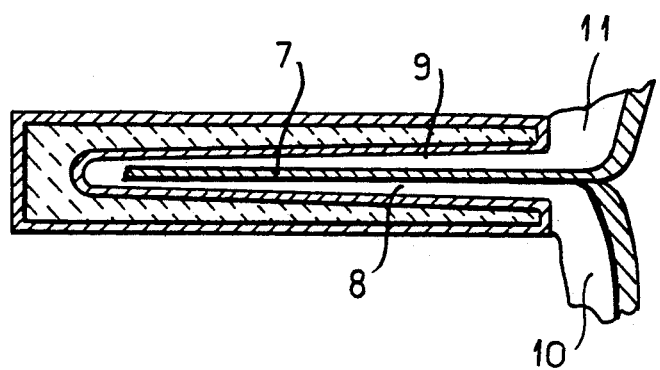
FIG. 7 is still another embodiment of the electrically heated shrinking frame according to the invention.

In the region of the inner side of the frame member, air strips 104 are provided with air outlet openings 105 for the outflowing hot air. Below the air strips, hot air guide plates 106 can be provided. The plates 106 can be pivotally mounted on hinges 52' and 52" as shown in FIG. 1A with respect to the plates 24 and 25 flanking or defining the outlet slit 11.

In the tubular frame members of the shrinking frame 100, so-called heating cores 107, constituting heating rod and plate assemblies, are provided. The heating cores 107 are supported in angled support elements 108 in the region of the corners of the frame. These support elements 108 have vertical slits 109 into which the ends of the heating core can be inserted. The heating cores 107 are inserted into the support elements 108 with the aid of fastening plates 110 which are arranged on the upper side of the shrink frame 100.

Each heating core 107 comprises a plurality of holding bars 111 extending in the direction of, i.e. parallel to, the frame sides and which at one end are fixed in a vertically oriented fixed mounting plate 112 At their opposite ends, the holding bars are only supported loosely in a loose-mounting plate 113 so as to be longitudinally shiftable therein. On an upper holding bar located in the central pane of the heating core 107, a plurality of partial bulkhead plates 114 are fixed with gaps or spaces 115 between them so as to define a common central bulkhead subdividing the heating core 107.

On both sides of the central bulkhead, bulkhead plates 116 are arranged and are of U-cross section so that their U-shanks 117 extend in the direction of, i.e. parallel to, the frame sides and are bridged by a web 118 of the U. The web has throughgoing openings 119.

The inwardly disposed U shanks 117 are located in the gaps 115.

The holding bars 111 and the electrically heated heating rods 120 are guided in and traverse the throughgoing openings 119.

The heating rods 120 are U-shaped and have their ends affixed in the fixed mounting plate 112. The remainders of the heating rods, depending upon the thermally induced expansion, are shiftable within the heating core 107, thereby preventing the development of stresses as a result of thermal expansion and contraction. The heating rods 120 project with their terminals or ends 121 beyond the fixed mounting plate 112.

The air to be heated is supplied in the direction of arrow 122 at one side of the separating bulkhead 114 an passes them onto the other side. Both in the region of the fixed mounting plate 112 and in the region of the loose mounting plate 113, cooling chambers 123 are provided at the inner side, cooling air being supplied in the direction of arrow 124 to these cooling chambers.

The cooling chambers 123 comprise an outer closure plate 125 on which a sealing strip 126 is provided. This sealing strip 126 serves to seal against an insulating hood 127 of U-shaped internal cross section which is heated on the heating core 107 between the fixed mounting plate 112 and the loose mounting plate 113. The insulating hood 127 has an outer cover layer 128 and an inner cover layer 129 sandwiching insulating material 130 between them. The inner cover layer is formed with mutually spaced cover segments. Aluminum foil 131 can be embedded in the insulating material sandwiched between the outer cover layer 128 and the inner cover layer 129.

The heating core 107 can be easily mounted on the frame and, for repair or maintenance purposes, can also be simply removed. Thermally induced deformations of individual parts of the heating core 107 or the insulating hood 127 need not be feared since all parts which may be subject to high temperatures can move relative to one another.

As can be seen from FIG. 5, an air collecting hood 51 can be provided on the frame F in the embodiment of FIGS. 1, 2 and 5. Furthermore, barriers slidable in slots 152 produced in inner walls of the members and shown only diagrammatically at 52 can be provided at the outlet slit to block out flow where the delivery of excess hot air is not desired or required.

We claim:

1. A shrink frame for shrinking a plastic film on an article to be shrink-wrapped, said shrink frame comprising:
   a plurality of hollow frame members surrounding an opening into which said article can pass;
   an air inlet opening into said frame members;
   outlet means formed along inner sides of said frame members for directing hot air toward said article when said article is received in said opening;
   air-guide passages formed in said members and interconnecting said inlet with said outlet means, said air-guide passages having segments extending substantially linearly in cross sectional planes of said members and defining U-shanks of a U-shaped flow path for air between said air inlet and said outlet means within each of said members formed with a respective pair of opposite spaced apart walls bridged by a respective end wall and defining a respective shaft therebetween;
   a respective longitudinal partition extending into each of said shafts parallel to the walls and terminating at a distance from the respective end wall; and
   U-shaped electric heating rods in at least one of the U-shanks of each of said U-shaped flow paths for heating air traversing same, said electrical heating rods being oriented at angles to the respective partition in a cross sectional plane of each of said shafts with a spacing between rod centers at least equal to twice a rod diameter and extending in longitudinal directions of said shaft, each of said rods being supported by at least two metal bulkhead plates.

2. The shrink frame defined in claim 1, further comprising conductive means electrically connecting terminal-forming ends of said rods together.

3. The shrink frame defined in claim 2 wherein the neighboring rods are formed with identically poled terminal-forming ends interconnected by current-carrying busbars.

4. A shrink frame for shrinking a plastic film on an article to be shrink-wrapped, said shrink frame comprising:
   a plurality of longitudinal hollow frame members, each of said members being formed with respective spaced apart inner and outer walls bridged by a respective end wall, each of said members being formed with a respective longitudinal air-guide passage delimited by a pair of opposite spaced-apart passage walls defining a shaft open at a side thereof opposite the respective end wall, said members surrounding an opening into which said article can pass;
   an air inlet opening into said frame members;
   a plurality of longitudinal air distribution inlet ducts operatively connected with said air inlet, each of said inlet ducts being formed on the respective outer wall of each of said members and being spaced from a respective one of said end walls at a first distance, each of said ducts extending parallel to a respective one of said outer walls of said members and being provided with a plurality of spaced apart distribution orifices opening into a respective one of said passages;
   longitudinal outlet means formed along a respective one of said inner walls of each of said frame members for directing hot air toward said article when said article is received in said opening;
   a respective longitudinal partition extending into each of said shafts from the respective one of said sides thereof parallel to the inner and outer walls and toward the respective one of said top walls but terminating at a second distance shorter than said first distance from the top wall, each of the partitions forming with a respective one of said passage walls a first compartment communicating with the respective orifices in each of said air-guide passages, said partition defining with a respective one of the other passage walls a second compartment and forming a respective longitudinal air flow path having a transverse U-shaped cross-section between the orifices and outlet means of each of said members, each of said compartments extending substantially linearly in cross sectional planes of the respective member and defining a respective pair of shanks each having a generally longitudinal U-shaped cross-section of a respective one of said U-shaped paths, each of said U-shaped paths including:
- a generally linear upstream portion of the air flow path in the first compartment extending between the orifices and the respective end wall,
- a generally linear downstream portion of the path in the second compartment between the end wall and the outlet means, and
- a portion connecting the upstream and downstream portions between the end wall and the partition; and
- electric heating elements in each of the of the U-shanks along said upstream portion between said inlet and the respective one of said end walls and downstream portion of the respective one of said U-shaped flow paths for heating air traversing same.

5. The shrink frame defined in claim 4 wherein each of said air-guide passages comprises:
- a pair of opposite spaced-apart walls defining a shaft open at one side thereof; and
- a partition extending into said shaft from said one side thereof and defining with one of said walls a segment of a respective one of said flow paths communicating with said air inlet, said partition defining with the other of said walls another segment of said one of said flow paths communicating with said outlet means.

6. The shrink frame defined in claim 4 wherein said shaft is embedded insulating material within said members and the insulating material surrounds said shaft.

7. The shrink frame defined in claim 4 wherein said shafts are upright and said sides are lower sides of said shafts.

8. The shrink frame defined in claim 4 wherein said shafts are horizontal or are oriented at an angle to the horizontal in said members.

9. The shrink frame defined in claim 4 wherein said outlet means is formed by slit nozzles extending along inner walls of said members and defined on opposite sides by respective deflecting plates oriented at angles to a plane of the frame, and a passage connecting each slit nozzle with the respective shaft preventing direct exposure top radiation from said elements externally of said frame.

10. The shrink frame defined in claim 9 wherein at least one of said deflecting plates is mounted for adjustment of its angle setting.

11. The shrink frame defined in claim 4 wherein said frame is formed with adjustable airflow damming members in the direction of said article.

12. The shrink frame defined in claim 4 wherein said frame has vertical walls forming hot-air guides.

13. The shrink frame defined in claim 4, further comprising a hood on said members.

14. The shrink frame defined in claim 4, further comprising means for adjusting the flow through said openings.

15. The shrink frame defined in claim 4 wherein said elements are heating rods extending substantially parallel to said members and disposed in thermally insulated heating cores having air-feed passages, said heating rods each being fixed at one end on the heating core and being capable of shifting under thermal expansion therein.

16. The shrink frame defined in claim 15 wherein said heating cores are formed with holding bars extending in longitudinal dimensions of the respective members, said holding bars being fastened at one ends in a fixed plate and at an opposite end on a movable support plate.

17. The shrink frame defined in claim 16 wherein said rods are anchored at one end on said fixed plate and the remainders of said rods are mounted on metal bulkhead plates carried by said holding bars.

18. The shrink frame defined in claim 17 wherein said metal bulkhead plates are of U-section having shanks extending in the direction of the respective members and web formed with throughgoing openings traversed by said holding bars and said rods.

19. The shrink frame defined in claim 18 wherein said heating cores have an intermediate metal bulkhead extending in a direction of a longitudinal side of said frame and comprised of a plurality of partial bulkheads mounted on one of said bars, and said metal bulkhead plates have U-shanks disposed in regions of gaps of the partial bulkheads.

20. The shrink frame defined in claim 19 wherein said rods are disposed along opposite sides of said intermediate bulkhead.

21. The shrink frame defined in claim 20 wherein said heating cores are each covered with a respective insulation hood of U-shaped cross section.

22. The shrink frame defined in claim 21 wherein said hoods have inner and outer layers receiving an insulation material between them, said inner layer being formed from cover sections having a mutual spacing between them.

23. The shrink frame defined in claim 22 wherein said heating cores are provided in the region of said fixed plate and/or said movable plate with cooling zone plates coolable by fresh air and defining fresh-air-coolable zones.

* * * * *